(12) United States Patent
Park et al.

(10) Patent No.: US 10,114,522 B2
(45) Date of Patent: Oct. 30, 2018

(54) METHOD OF CONTROLLING DISPLAY OF DISPLAY DEVICE BY MOBILE TERMINAL AND MOBILE TERMINAL FOR THE SAME

(71) Applicant: Samsung Electronics Co., Ltd., Gyeonggi-do (KR)

(72) Inventors: Ho-Yeon Park, Seoul (KR); Se-Hee Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 980 days.

(21) Appl. No.: 13/872,783

(22) Filed: Apr. 29, 2013

(65) Prior Publication Data

US 2014/0026068 A1 Jan. 23, 2014

(30) Foreign Application Priority Data

Jul. 20, 2012 (KR) ........................ 10-2012-0079367

(51) Int. Cl.
*G06F 3/0482* (2013.01)
*G06F 3/0486* (2013.01)
(Continued)

(52) U.S. Cl.
CPC .......... *G06F 3/0482* (2013.01); *G06F 3/0486* (2013.01); *G06F 3/1423* (2013.01); *G06F 3/1462* (2013.01); *G09G 5/14* (2013.01); *H04N 21/4122* (2013.01); *H04N 21/4126* (2013.01); *H04N 21/41407* (2013.01); *H04N 21/42207* (2013.01); *H04N 21/42208* (2013.01);
(Continued)

(58) Field of Classification Search
CPC ................ G06F 3/0481; G06F 3/0486; H04L 29/08072; H04L 29/06; H04L 29/0899
See application file for complete search history.

(56) References Cited

U.S. PATENT DOCUMENTS

2003/0069923 A1* 4/2003 Peart ............................ 709/203
2007/0211734 A1* 9/2007 Yang et al. ................... 370/401
(Continued)

FOREIGN PATENT DOCUMENTS

CN 101917673 12/2010
CN 102238280 11/2011
(Continued)

OTHER PUBLICATIONS

European Search Report dated Jan. 19, 2016 issued in counterpart application No. 13819823.9-1905, 7 pages.
(Continued)

*Primary Examiner* — Mandrita Brahmachari
(74) *Attorney, Agent, or Firm* — The Farrell Law Firm, P.C.

(57) ABSTRACT

Disclosed is a method of controlling a screen display of an external display device by a mobile terminal, including when a connection between the mobile terminal and the external display device is performed, transmitting image data to the external display device and displaying an image displayed in the mobile terminal in the external display device, and when a selection command for one of objects included in the image data is input in the mobile terminal, moving a position of the image displayed in the external display device and then controlling such that the image is displayed together with an image of the object for the selection command.

16 Claims, 8 Drawing Sheets

(51) Int. Cl.

| | | |
|---|---|---|
| *G06F 3/14* | (2006.01) | |
| *G09G 5/14* | (2006.01) | |
| *H04N 21/41* | (2011.01) | |
| *H04N 21/414* | (2011.01) | |
| *H04N 21/422* | (2011.01) | |
| *H04N 21/436* | (2011.01) | |
| *H04N 21/4363* | (2011.01) | |
| *H04N 21/4782* | (2011.01) | |
| *H04N 21/431* | (2011.01) | |

(52) U.S. Cl.
CPC ... *H04N 21/42224* (2013.01); *H04N 21/4316* (2013.01); *H04N 21/43615* (2013.01); *H04N 21/43637* (2013.01); *H04N 21/4782* (2013.01); *G09G 2340/0492* (2013.01); *G09G 2340/14* (2013.01); *G09G 2370/10* (2013.01); *G09G 2370/16* (2013.01)

(56) References Cited

U.S. PATENT DOCUMENTS

| | | | |
|---|---|---|---|
| 2009/0092185 A1 | 4/2009 | Kwon et al. | |
| 2010/0299436 A1 | 11/2010 | Khalld et al. | |
| 2010/0313143 A1* | 12/2010 | Jung | G06F 3/1446 715/753 |
| 2011/0075031 A1* | 3/2011 | Jung | H04N 5/45 348/565 |
| 2011/0099512 A1* | 4/2011 | Jeong | 715/790 |
| 2011/0216064 A1* | 9/2011 | Dahl et al. | 345/428 |
| 2011/0268218 A1 | 11/2011 | Kang et al. | |
| 2011/0283334 A1 | 11/2011 | Choi et al. | |
| 2012/0017236 A1 | 1/2012 | Stafford et al. | |
| 2012/0019674 A1* | 1/2012 | Ohnishi et al. | 348/207.1 |
| 2012/0038541 A1 | 2/2012 | Song et al. | |
| 2012/0042102 A1 | 2/2012 | Chung et al. | |
| 2012/0088447 A1 | 4/2012 | Kwahk et al. | |
| 2012/0088548 A1 | 4/2012 | Yun et al. | |
| 2012/0131458 A1* | 5/2012 | Hayes | H04N 21/41407 715/716 |
| 2013/0040623 A1* | 2/2013 | Chun | H04N 21/4126 455/414.2 |
| 2013/0094423 A1* | 4/2013 | Wengrovitz et al. | 370/312 |
| 2013/0103446 A1* | 4/2013 | Bragdon et al. | 705/7.15 |
| 2013/0125018 A1 | 5/2013 | Park et al. | |

FOREIGN PATENT DOCUMENTS

| | | |
|---|---|---|
| CN | 102301738 | 12/2011 |
| CN | 102447969 | 5/2012 |
| EP | 2 385 689 | 11/2011 |
| KR | 1020120015931 | 2/2012 |
| WO | WO 2010/143843 | 12/2010 |
| WO | WO 2012/026750 | 3/2012 |

OTHER PUBLICATIONS

Chinese Office Action dated Mar. 2, 2017 issued in counterpart application No. 201380038728.7, 18 pages.

Chinese Office Action dated Sep. 12, 2017 issued in counterpart application No. 201380038728.7, 12 pages.

* cited by examiner

METHOD OF CONTROLLING DISPLAY OF DISPLAY DEVICE BY MOBILE TERMINAL AND MOBILE TERMINAL FOR THE SAME

PRIORITY

This application claims priority under 35 U.S.C. § 119(a) to Korean Application Serial No. 10-2012-0079367, which was filed in the Korean Intellectual Property Office on Jul. 20, 2012, the contents of which are incorporated herein by reference.

BACKGROUND OF THE INVENTION

1. Field of the Invention

The present invention relates generally to an apparatus and a method for controlling a display in a mobile terminal, and more particularly, to an apparatus and a method for controlling a display in an external display device in a mobile terminal having a function of outputting an image to the external display device.

2. Description of the Related Art

Interest in a digital broadcasting service for allowing a user to watch a digital broadcast while moving has increased as digital broadcasting and mobile communication technologies have evolved. Concurrently, a paradigm of the broadcasting service has been changed from the broadcasting service having a passive concept in which the user only passively watches the broadcast to the broadcasting service having an active concept in which the user identifies information on a cost of a product shown in the broadcast and purchases the product while directly watching the broadcast.

Interest in a Digital Multimedia Broadcasting (DMB) service using a mobile terminal has also increased. The DMB service overcomes spatial and temporal limitations in watching the broadcast, but is not suitable for the broadcast simultaneously watched by several people due to screen size limitations. Accordingly, there have been increased releases of mobile terminals having a function of outputting a signal to a large sized display device, such as a TV.

A current mobile terminal having a Television (TV) out function can output a video such as a broadcast displayed through a screen of the mobile terminal to an external display device. Accordingly, the user can watch the broadcast through a larger sized screen by outputting image data downloaded from a web server or photographed by a camera to the external display device. Examples of advanced mobile terminals having the TV out function include a Wi-Fi Display (WFD) and an airplay mirroring.

Figure 1:
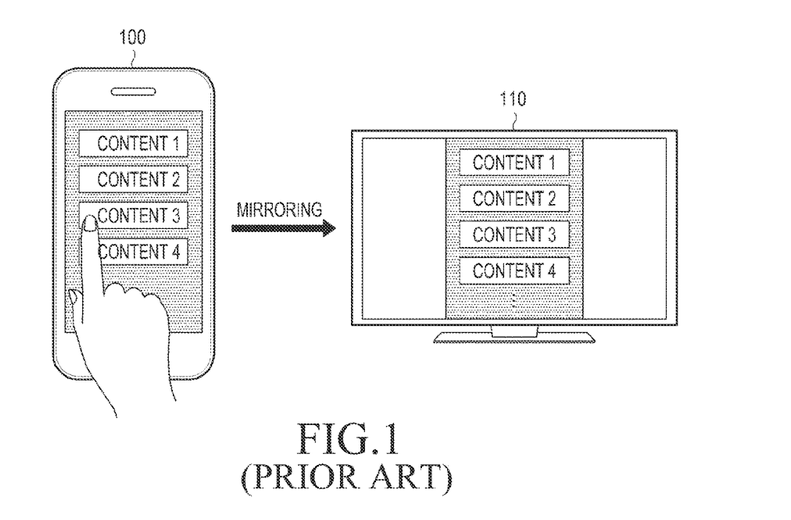
FIG. 1 illustrates a TV screen when a screen of a conventional mobile terminal is mirrored.

For example, WFD refers to a technology in which a small sized screen of a mobile terminal 100 interworks with an external display device such as a TV 110 and then the same screen as that of the mobile terminal 100 is wirelessly displayed in the TV as illustrated in FIG. 1. When a user input is performed through the mobile terminal screen 100, a current screen is switched to a screen corresponding to the user input. The screen of the TV 110 is switched to the same screen as that of the mobile terminal 100.

However, the same image as the image on the mobile terminal screen is located in the center of the TV screen. Accordingly, while the same image as the image on the mobile terminal screen is displayed on an entire TV screen when a screen direction of the mobile terminal is horizontal, the remaining parts except for the center of the TV screen remain as empty spaces, as illustrated in FIG. 1, when the screen direction is vertical. That is, due to a difference between a screen size of the mobile terminal and a screen size of the TV, the empty spaces are generated on the TV screen as illustrated in FIG. 1.

Accordingly, there is a need in the art for the user to be able to control a screen display of the external display device in displaying an image on the mobile terminal screen on the external display device, to enable the user to receive a more vivid and efficient image in comparison with using the mobile terminal.

SUMMARY OF THE INVENTION

Accordingly, the present invention provides an apparatus and a method for controlling the screen display of the external display device by the mobile terminal.

The present invention also provides an apparatus and a method for providing an efficient screen display of the external display device.

In accordance with an aspect of the present invention, a method of controlling a display of a display device by a mobile terminal includes, when a connection with the display device is performed, transmitting second content equal to first content displayed on the mobile terminal to the display device, receiving a selection of one object of objects included in the first content displayed on the mobile terminal, and transmitting information on third content corresponding to a selected object to the display device so that the second content and the third content corresponding to the selected object are displayed together in the display device.

In accordance with another aspect of the present invention, a mobile terminal for controlling a display of a display device includes a connector for performing a connection with the display device, a touch screen for displaying a first content and outputting a selection signal according to a selection of one object from objects included in the first content, and a controller for controlling such that second content equal to the first content is transmitted to the display device through the connector, and controlling such that when the selection signal according to the selection of the one object is transferred from the touch screen, information on a third content corresponding to the selected object is transmitted to the display device so that the second content and third content corresponding to the selected object are displayed together on the display device.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described with reference to the accompanying drawings. In the following description, the same elements will be designated by the same reference numerals although they are shown in different drawings. In the following description of the present invention, a detailed description of known functions and configurations incorporated herein will be omitted for the sake of clarity and conciseness.

The present invention provides a method of controlling a screen display of an external display device in a mobile terminal. To this end, the present invention includes a process of controlling such that a mobile terminal is connected with a neighboring external display device, image data is transmitted to the external display device to display an image displayed on a screen of the mobile terminal on the external display device, and a position of the image displayed on the external display device is moved and the image is displayed with an object image for the selection command when a selection command for one of objects included in the image data is input on the mobile terminal. Accordingly, it is possible to efficiently control an output screen of the external display device.

Figure 2:
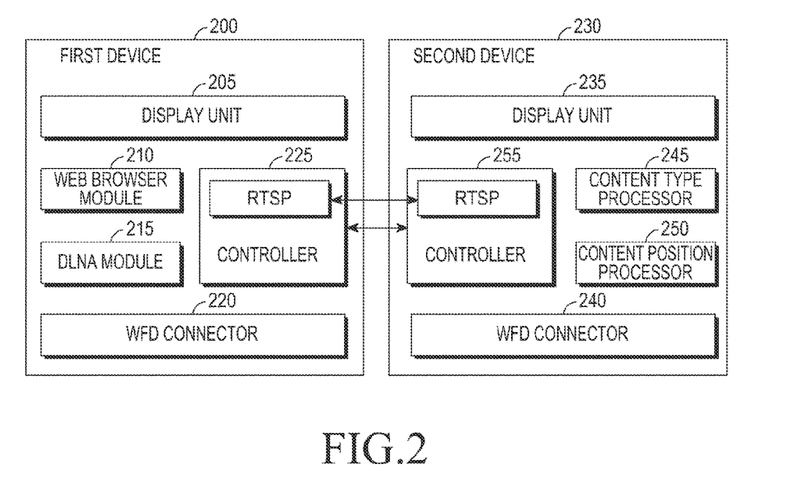
FIG. 2 illustrates an internal block diagram of a first device and a second device according to an embodiment of the present invention.

FIG. 2 illustrates an internal block diagram of a first device and a second device according to an embodiment of the present invention. In FIG. 2, a first device 200 is the mobile terminal supporting an image viewing function such as a smart phone, a mobile phone, or a tablet PC, and a second device 230 is the external display device, such as a TV, having a larger sized screen than a screen of the first device 200.

The first device 200 includes a display unit 205, a web browser module 210, a Digital Living Network Alliance (DLNA) module 215, a Wi-Fi Display (WFD) connector 220, and a controller 225.

The display unit 205 may be implemented by a Liquid Crystal Display (LCD) panel, and operates as an input means when the LCD panel is implemented in a touch screen type. The display unit 205 serves to display information input by or provided to the user, as well as various types of menus of the mobile terminal. When the display unit 205 is implemented in the touch screen type, an input signal is output to the controller 225 if there is a touch input from the user. The controller 225 identifies an input type by means of the signal input through the touch screen, and determines, for example, a hold, a drag, and a drop.

When an Internet browser is operated according to a request of the user, the web browser module 210 accesses Uniform Resource Locator (URL) information input to an Internet address window through a web server to generate a web page according to a received packet. The web browser module 210 provides web content showing the web page to the controller 225.

The DLNA module 215 provides media content to the controller 225 in order to transmit the media content, such as a video, to the second device 230 in a streaming type. The DLNA module 215 shares the media content with the second device 230, to allow the user to continuously watch the media content stored in the first device 200 in the second device 230.

The WFD connector 220 searches for the neighboring second device 230 which is available for a Wi-Fi Direct service. When the second device 230 is found, the WFD connector 220 serves to connect the first device 200 with the second device 230 through a process of exchanging a device capability with the second device 230.

The controller 225 controls a general operation within the first device 200. Specifically, the controller 225 controls such that contents such as web content from the web browser module 210 or media content from the DLNA module 215 are transmitted to the second device 230 through the WFD connector 220 based on a Real Time Streaming Protocol (hereinafter RTSP).

The controller 225 determines an input signal form from the user through the display unit 205 to control the first device 200 in accordance with the determination. For example, when the user inputs a selection command for an object included in an image displayed on the display unit 205, the controller 225 controls the web browser module 210 or the DLNA module 215 so that detailed data on the selected object is displayed. In addition, the controller 225 transmits currently displayed content to the second device 230, and a transmission type of the content follows a streaming type, so that a detailed description thereof will be omitted. Actual content may be transmitted according to the streaming type, or alternatively, only a content address to receive the content may be transmitted and then the second device 230 may access the content address to display the same content.

After the same content as the currently displayed content is transmitted to be displayed on the second device 230 in the streaming type, if a selection command for one of the objects included in the content is input, detailed data on the selected object is transmitted to the second device 230. The detailed data on the selected object is inserted into a parameter based on an RTSP and then transmitted. For example, the detailed data on the selected object includes actual content data, an address to receive the content data, a display position, and a content type.

When the user touches a particular content or a web page among lists found through the web browser with his/her finger and then performs a drag and drop leftwards, the first device 200 transmits to the second device 230 a signal for instructing to prepare such that the particular content or the web page is displayed in a left side of the screen of the second device 230. In response to the signal, content displayed in a center of the screen moves in order to display the particular content or the web page in the left side of the screen of the second device 230.

The operation performed in the second device 230 will be described below in detail.

The second device 230 includes a display unit 235, a WFD connector 240, a content type processor 245, a content position processor 250, and a controller 255.

The controller 255 receives the same content as the content displayed on the first device 200 in the streaming type and controls such that the content is displayed on the display unit 235. When a command for designating a display position of the selected object based on the RTSP, that is, the selected content is received through the WFD connector 240, the controller 255 moves the content on a current screen to secure a screen space where the selected content is rendered, in response to the command. When the screen space is secured, the controller 255 controls such that selected content is displayed on the display unit 235 with the previous content.

Specifically, the controller 255 divides the screen into two spaces to simultaneously display the current content and the newly selected content, and controls such that the current content and the newly selected content are disposed in the divided screen spaces, respectively. The current content which had been displayed in the center is disposed in the screen space corresponding to an opposite side of the display position of the selected content among the divided screen spaces.

A size of each of the divided screen spaces can be variously set. For example, the screen may be divided to maintain a display magnification of the current content which had displayed in the center of the screen, and in this case, the newly selected content is displayed in the remaining screen space other than the screen space displaying the current content. In order to display the current content and the newly selected content with the same size, the screen may be divided into screen spaces having the same size. A method of dividing the screen for displaying the content is not limited thereto.

Accordingly, the display unit 235 may display an image changed according to an object selection in the first device 200 as well as display the same image as the image displayed through the display unit 205 of the first device 200.

The content type processor 245 determines a type of the content received from the first device 200 and provides the content to the controller 255. The content type refers to a type of contents such as web content and media content, and for example, the web content may be set to "web", the media content may be set to a "video", and an advertisement may be set to an "ads video".

When a content address is included in the detailed data on the selected object, the content position processor 250 accesses the web server corresponding to the content address, receives content corresponding to the selected object, and provides the content to the controller 255.

Figure 3:
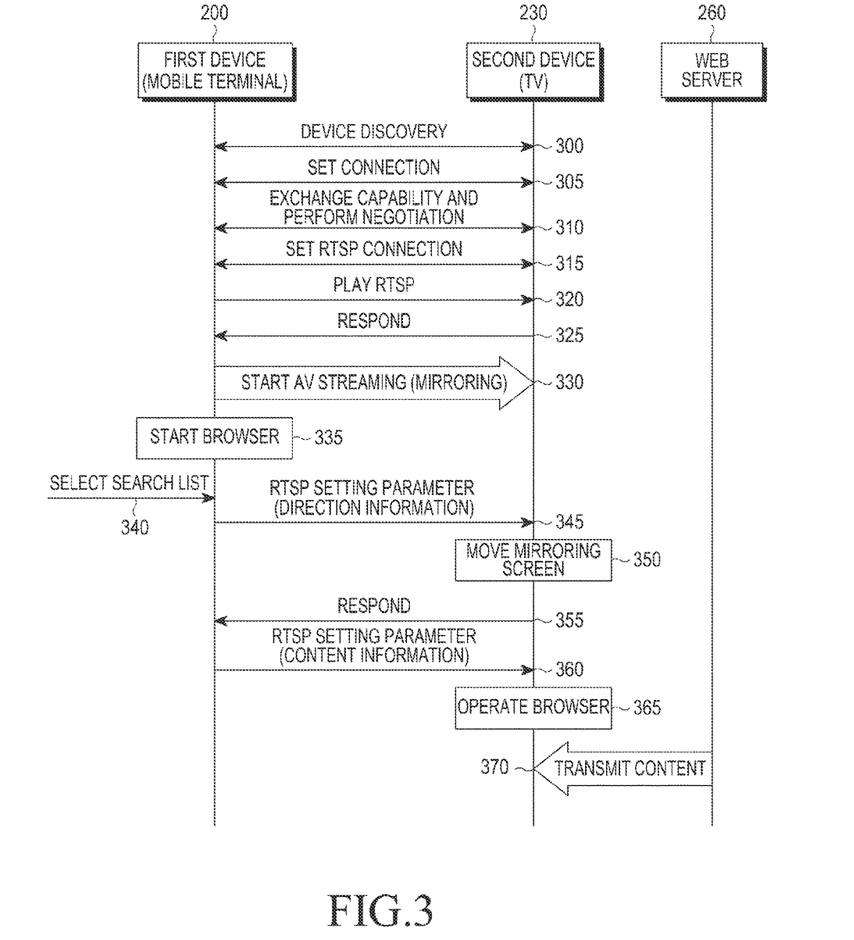
FIG. 3 illustrates an operation between the first device and the second device to control a screen display of the second device according to a first embodiment of the present invention.

An operation between the first device and the second device to control a screen display of the second device according to a first embodiment of the present invention will now be described with reference to FIG. 3. In FIG. 3, the first device 200 is the mobile terminal, and the second device 230 is a TV.

Referring to FIG. 3, the mobile terminal 200 performs a device discovery to find a neighboring external display device supporting Wi-Fi Direct in step 300. When the TV 230 is found as an example of the external display device, the mobile terminal 200 sets a connection with the TV 230 in step 305, and exchanges a capability and performs a negotiation in step 310. The mobile terminal 200 sets an RTSP connection to transmit a command in step 315, and then directly transmits content displayed on a screen of the mobile terminal 200 to the TV 230 through an RTSP play command in step 320.

When a response is received from the TV 230 in step 325, the mobile terminal 200 starts an Audio/Video (AV) streaming for a mirroring in step 330. Accordingly, the content is transmitted to the TV 230 through the streaming type. Since processes of connecting the mobile terminal 200 and the TV 230 in steps 300 to 330 are performed based on a general Wi-Fi Direct technique, a detailed description of connection processes according to the Wi-Fi Direct technique will not be made in the present invention.

Figure 4:
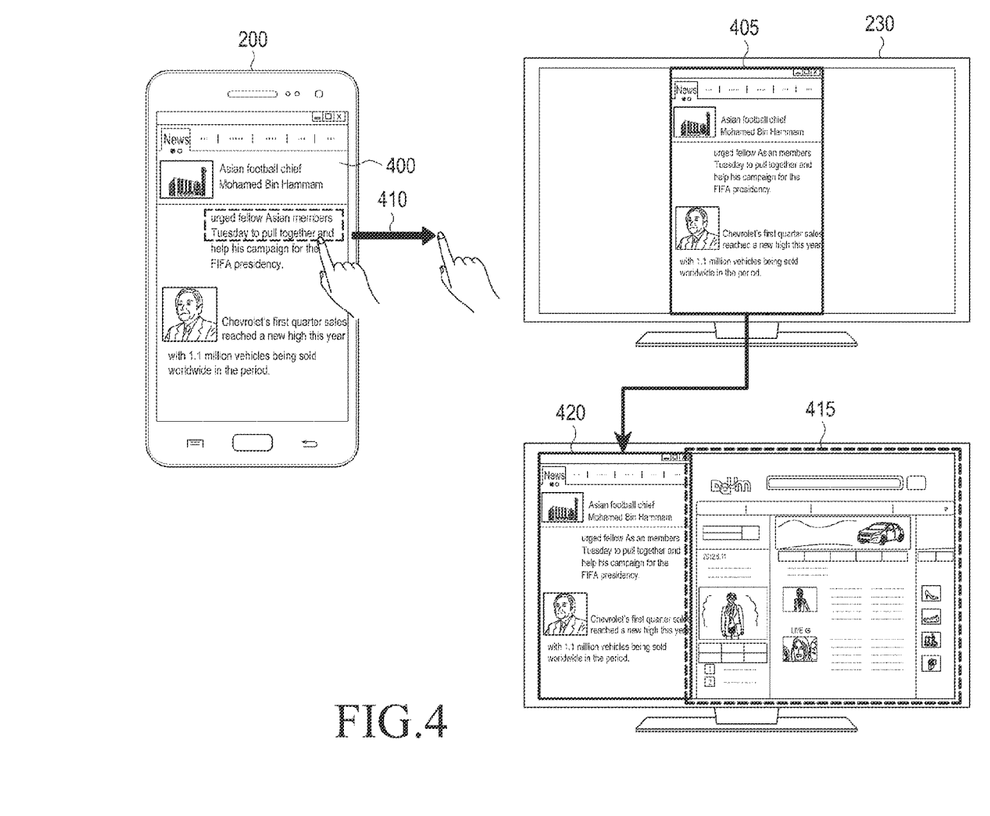
FIG. 4 illustrates an example for describing a method of the operation of FIG. 3.

When the web browser is started in the mobile terminal 200 as shown in step 335, the user selects one from a search list in step 340. When the web browser is started, web content 440 is displayed in the mobile terminal 200 and the same web content 405 is displayed in the TV 230 as the web content 400 is provided to the TV 230 through the streaming type as illustrated in FIG. 4.

When a command for designating a display position on the TV 230 is input when one object included in the content 400 is selected by the user, the mobile terminal 200 transmits to the TV 230 the command for designating the display position on the TV 230. For example, when the user performs a drag and drop in a right direction 410 when the user touches one object included in the content 400 with his/her finger, the mobile terminal 200 determines an input signal according to the drag and drop. Accordingly, the mobile terminal 200 transmits an RTSP setting parameter including direction information indicating the direction in which the drag and drop is performed to the TV 230 in step 345.

When the RTSP setting parameter is received, the TV 230 moves a mirrored screen displayed in a center in step 350, and then transmits a response in step 355. To this end, the TV 230 analyzes direction information included in the RTSP setting parameter, and then moves the mirrored screen leftwards to display the content for the selected object in a right side when the drag and drop direction is a right direction.

The mobile terminal 200 determines that the screen space is secured in the TV 230 when receiving the response, and thus transmits content information corresponding to the selected object to the TV 230 by using the RTSP setting parameter in step 360.

For example, in FIG. 4, the TV 230 receives a content type set as the "web" and content information including a content address to receive the selected content such as http://xyz.com/news/20111022/headline.html. In response to the reception, the TV 230 operates the browser in step 365, and then accesses a web server 260 by using the content address to receive the content for the selected object in step 370. Accordingly, the TV 230 moves the mirrored screen 405, which had been displayed in the center, in the left direction opposite to the direction of the drag and drop of the user, and then displays the mirrored screen 405 in a left part 420 and the content for the selected object in a right part 415. Alternatively, an actual content instead of the content address may be transmitted as the content information in the streaming type.

Figure 5:
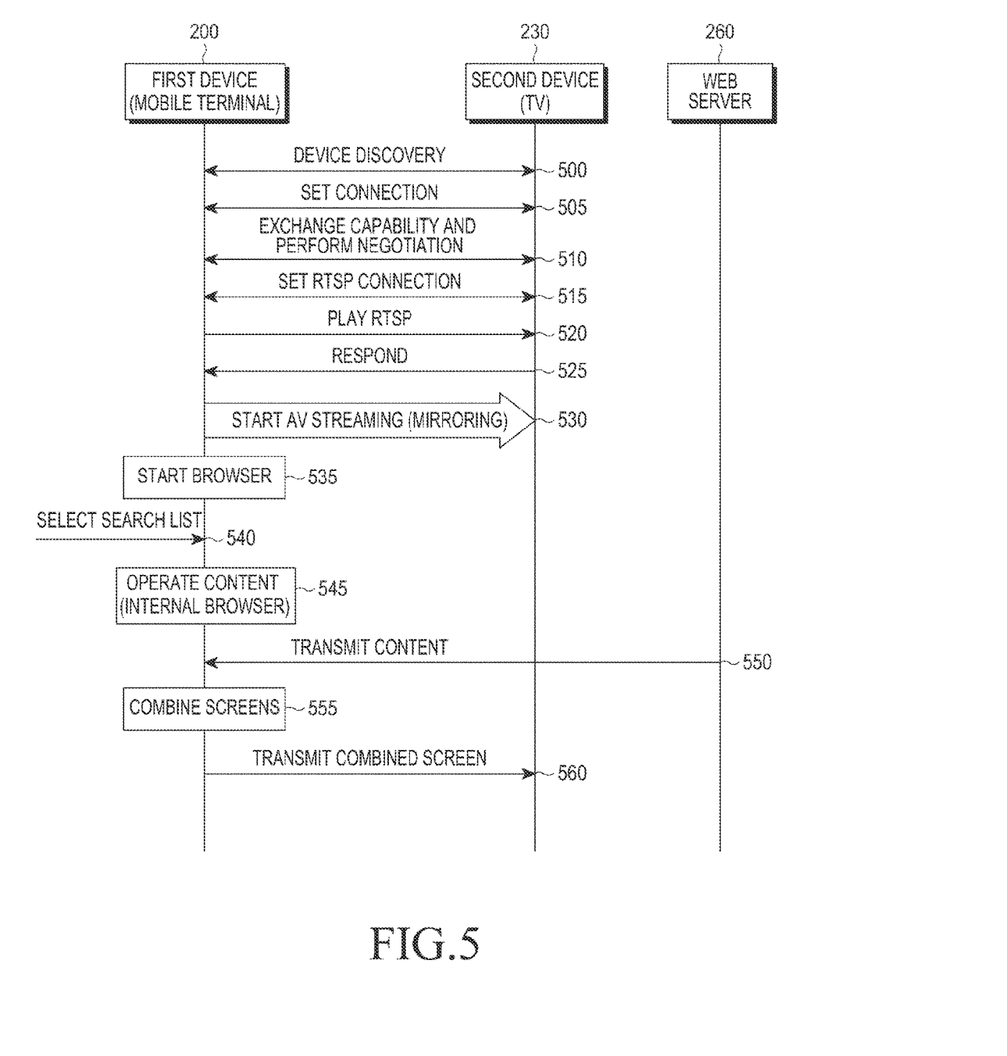
FIG. 5 illustrates an operation between the first device and the second device to control the screen display of the second device according to a second embodiment of the present invention.

FIG. 5 illustrates an example in which the mobile terminal 200 combines screens and transmits the combined screen according to a second embodiment of the present invention. Since steps 500 to 540 of FIG. 5 are the same as steps 300 to 340 of FIG. 3, a detailed description thereof will be omitted. However, when the content for the selected object is operated in step 545, the mobile terminal 200 directly receives the content for the selected object from the web server 260 in step 550, configures the screen generated by combining the provided content and previous content in step 555, and directly transmits information on the combined screen to the TV 230 in step 560 in the second embodiment of the present invention.

Figure 6:
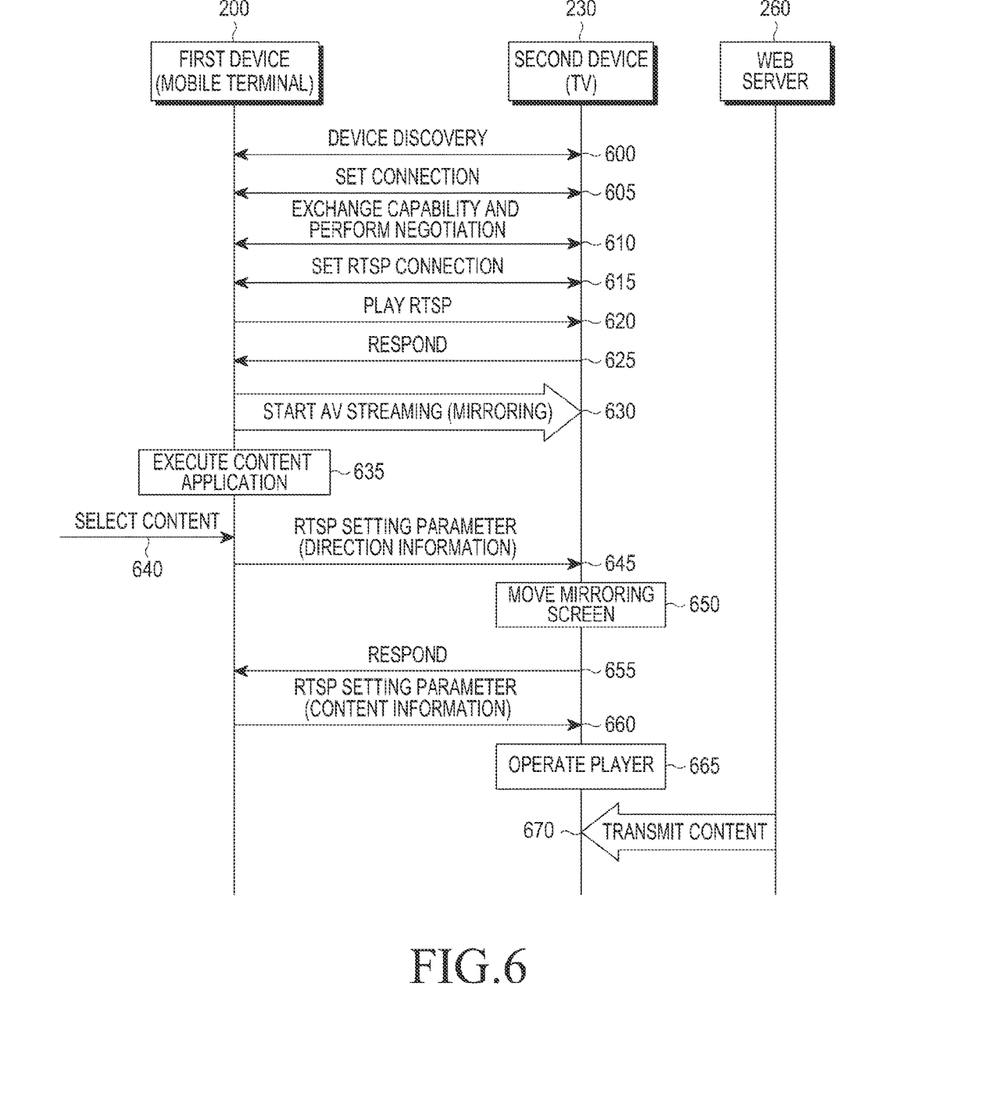
FIG. 6 illustrates the operation between the first device and the second device to control the screen display of the second device according to a third embodiment of the present invention.
Figure 7:
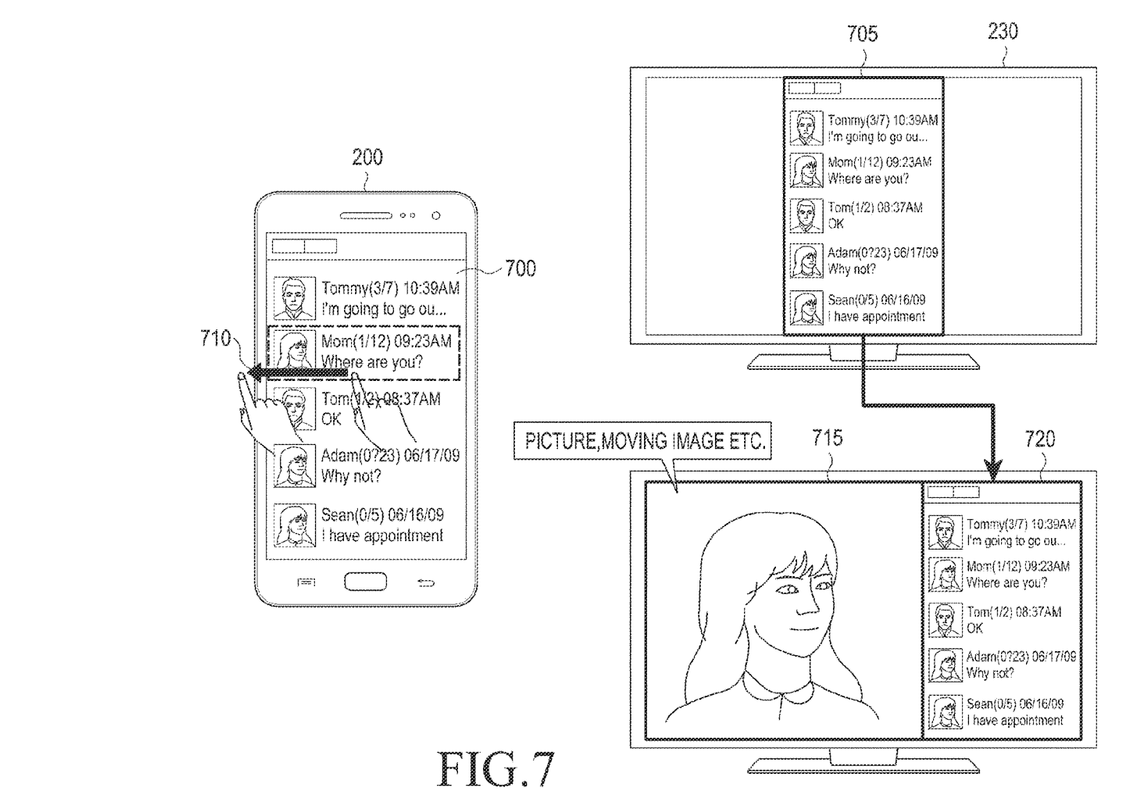
FIG. 7 illustrates an example for describing a method of the operation of FIG. 6.

FIG. 6 illustrates an example of an operation between the first device and the second device to control a screen display of the second device according to a third embodiment of the present invention. Since operations performed in steps 600 to 630 of FIG. 6 are the same as the operations performed in steps 300 to 330 of FIG. 3, a detailed description thereof will be omitted. However, in FIG. 6, when a content application is executed in step 635, the mobile terminal 200 displays a content list screen 700 as illustrated in FIG. 7. When a drag and drop 710 is performed by the user when one content is selected, a content list 705 displayed on the TV 230 moves to a right part 720, and the selected content is displayed in a left part 715.

An RTSP setting parameter transmitted in step 660 contains content information that includes a content type set as a "video" indicating that the content is media content and, for example, a content address set as "rtp://192.168.1.32/dlna_contents/thumnail.avi" When the RTST setting parameter is received, the TV 230 operates a player to execute the selected content in step 665, and accesses the web server 260 by using the content address to receive the content from the web server 260 in step 670. Accordingly, the content list is displayed in the right screen part 720 of the TV 230, and simultaneously, the content reproduced through the player is output in the left screen part 715.

Figure 8:
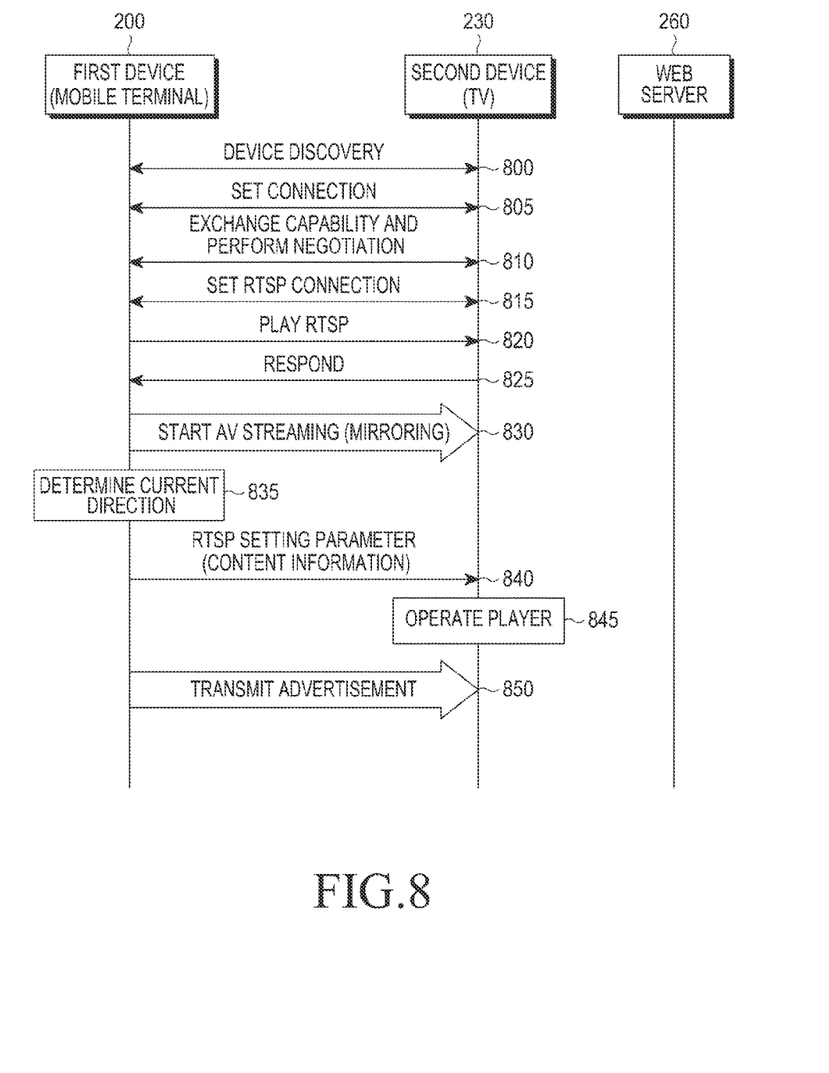
FIG. 8 illustrates an operation between the first device and the second device to control the screen display of the second device according to a fourth embodiment of the present invention.

FIG. 8 illustrates an operation between the first device and the second device to control a screen display of the second device according to a fourth embodiment of the present invention. Since operations of steps 800 to 830 of FIG. 8 are the same as the operations of steps 300 to 330 of FIG. 3, a detailed description thereof will be omitted. However, in FIG. 8, the mobile terminal 200 determines a display direction of a current screen in step 835. When the screen direction is a horizontal direction, there is no empty space on the screen of the TV 230. When the screen direction is a vertical direction, there is an empty space in both sides of a center on the screen. When the current screen direction is determined as the vertical direction, the mobile terminal 200 transmits the RTSP setting parameter containing information on the content to be displayed in the empty space in order to fill the empty space in step 840. Then, the TV 230 operates the player in step 845, and receives an advertisement to be displayed in the empty space from the mobile terminal 200 in step 850. Accordingly, the TV 230 can reproduce the advertisement through the player, so that the advertisement such as a video can be output.

Figure 9:
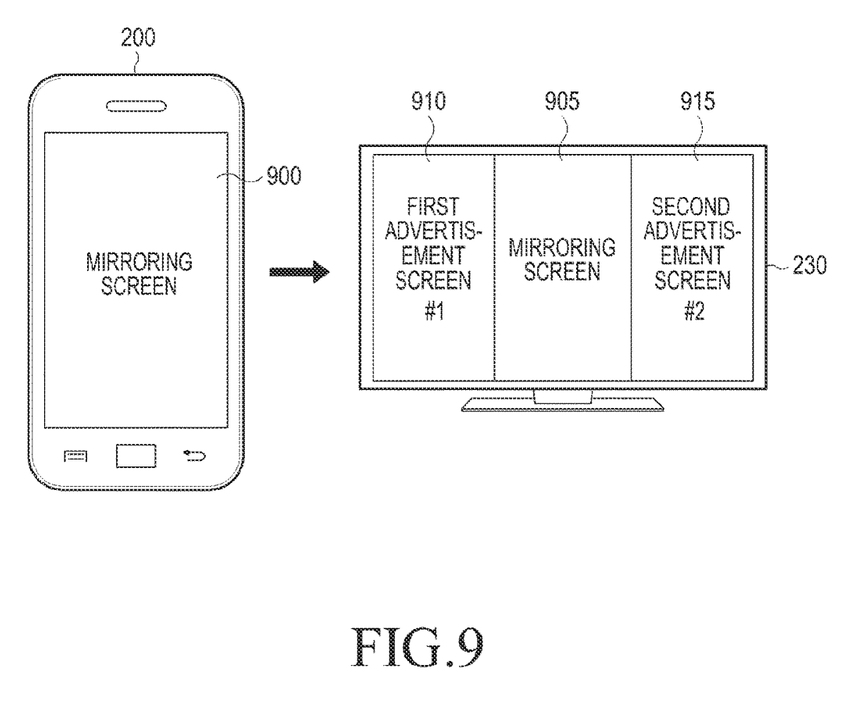
FIG. 9 illustrates an example for describing a method of the operation of FIG. 8.

Referring to FIG. 9, a mirrored screen of the TV 230 identical to a screen 900 of the mobile terminal 200 is located in a center part 905 of the TV 230. In this case, empty spaces are generated in left and right parts of the remaining screen except for the center part 905 of the TV 230. FIG. 9 illustrates an example where advertisement screens 910 and 915 are displayed together in both sides of the center of the mirrored screen 905. In this case, the content information contained in the RTSP setting parameter contains a content type as an "ads video" indicating that the content is an advertisement. When the mobile terminal 200 does not directly provide the advertisement, the content information may contain a content address to receive the advertisement.

As described above, according to the present invention, the user can view an image on the mobile terminal screen 200 through an enlarged screen by mirroring the image on the mobile terminal screen 200 to the TV 230, and can also view an image for object selection on the mobile terminal screen 200 together with a previous image through the TV 230.

According to the present invention, there is an advantage in that the user receives a more vivid and efficient image in comparison with using the mobile terminal since the user can control a screen display of an external display device. There is an advantage in that a dual screen is used according to characteristics of the device receiving a mirrored image, for example, a ratio of width to height and a web screen preview and a content preview are possible through a large sized screen of the external display device while maintaining the mobile terminal screen.

Moreover, there is an advantage of using the external display device as a new business model by showing an advertisement in an empty space of the device screen. For example, it is possible to ask an advertiser for advertisement profits by counting the number of times of advertisement reproductions and maximize an advertisement effect by using the advertisement as the purpose of advertising the mobile terminal product.

While the present invention has been shown and described with reference to certain embodiments thereof, it will be understood by those skilled in the art that various changes in form and details is made therein without departing from the spirit and scope of the present invention as defined by the appended claims. Therefore, several modifications are possible without departing from the gist of the present invention as defined by the appended claims. It should be understood that the modifications remain within the technical ideas and overviews of the invention.

What is claimed is:

1. A method of controlling a display of an external display device by a mobile terminal, the method comprising:
    transmitting, by the mobile terminal, when a connection with the external display device is performed, second content that is identical to first content displayed on the mobile terminal to the external display device, wherein the second content is displayed on the external display device, and wherein the second content occupies a portion of the external display such that the second content is mirrored based on a screen direction of the mobile terminal;
    receiving, by the mobile terminal, a touch input, through a touch screen of the mobile terminal, for selecting one object of a plurality of objects included in the first content displayed on the mobile terminal; and
    determining, by the mobile terminal, a screen direction of the mobile terminal;
    transmitting, by the mobile terminal, based on the determined screen direction being a vertical direction, information on third content corresponding to the selected object to be displayed in an empty space in order to fill the empty screen space not occupied by the second content on the external display device, to the external display device; and
    controlling, by the mobile terminal, the external display device to display the second content on a first area of the external display device and the third content corresponding to the selected object on a second area of the external display device.

2. The method of claim 1, wherein receiving, by the mobile terminal, the selection of the one object comprises receiving an input for designating a display position of the third content on the external display device.

3. The method of claim 2, wherein the input for designating the display position of the third content indicates a direction in which drag and drop according to a touch input is generated.

4. The method of claim 3, further comprising, when the input for designating the display position of the third content is made, transmitting a command for designating the display position of the third content to the external display device and displaying the third content together with the second content by moving a display position of the second content in the external display device.

5. The method of claim 4, wherein the second content is moved to and displayed in a part of a screen in an opposite direction of the direction in which the drag and drop is generated, and the third content is displayed in a part of the screen in the direction in which the drag and drop is generated.

6. The method of claim 1, wherein the information on the third content includes at least one of a content type of the third content and an address to receive the third content.

7. The method of claim 6, wherein the content type indicates one of web content, media content, and advertisement content according to a type of the third content.

8. The method of claim 1, further comprising performing a connection with the external display device based on a Wi-Fi Direct technique.

9. The method of claim 1, wherein the second content is transmitted based on a Real Time Streaming Protocol (RTSP).

10. The method of claim 1, wherein transmitting, by the mobile terminal, the information on the third content to the external display device comprises:
configuring, when the one object is selected, a combined screen to display the second content and the third content together on the external display device; and
transmitting information on the combined screen to the external display device.

11. A mobile terminal for controlling a display of an external display device comprising:
a communication circuit;
a touch screen; and
a processor configured to:
display first content on the touch screen;
transmit second content identical to the first content to the external display device through the communication circuit, wherein the second content is displayed on the external display device, and wherein the second content occupies a portion of the external display such that the second content is mirrored based on a screen direction of the mobile terminal;
receive, through the touch screen, a touch input for selecting one object of a plurality of objects included in the first content displayed on the mobile terminal
determine a screen direction of the mobile terminal;
transmit, using the communication circuit, based on the determined screen direction being a vertical direction, information on a third content corresponding to the selected object to be displayed in an empty space in order to fill the empty screen space not occupied by the second content on the external display device, to the external display device, and
control the external device to display the second content on a first area of the external display device and third content corresponding to the selected object on a second area of the external display device.

12. The mobile terminal of claim 11,
wherein the communication circuit provides web content showing a web page, and
a Digital Living Network Alliance (DLNA) module which provides media content.

13. The mobile terminal of claim 11, wherein the processor is further configured such that a command for designating a display position of the third content is transmitted to the external display device when there is an input for designating the display position of the third content on the external display device through the touch screen.

14. The mobile terminal of claim 13, wherein the input for designating the display position of the third content indicates a direction in which a drag and drop according to a touch input is generated through the touch screen.

15. The mobile terminal of claim 13, wherein the second content is moved to and displayed in a part of a screen in an opposite direction of the direction in which the drag and drop is generated, and the third content is displayed in a part of the screen in the direction in which the drag and drop is generated.

16. The mobile terminal of claim 11, wherein the information on the third content includes at least one of a content type of the third content and an address to receive the third content.

* * * * *